(12) United States Patent
Wang et al.

(10) Patent No.: US 12,175,030 B1
(45) Date of Patent: Dec. 24, 2024

(54) PEN MOUSE

(71) Applicant: PIXART IMAGING INC., Hsin-Chu (TW)

(72) Inventors: Yen-Hung Wang, Hsin-Chu (TW); Hung-Yu Lai, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 18/393,690

(22) Filed: Dec. 22, 2023

(51) Int. Cl.
*G06F 3/038* (2013.01)
*G06F 3/0354* (2013.01)

(52) U.S. Cl.
CPC ........ *G06F 3/0386* (2013.01); *G06F 3/03545* (2013.01)

(58) Field of Classification Search
CPC ............................ G06F 3/03545; G06F 3/0386
See application file for complete search history.

(56) References Cited

U.S. PATENT DOCUMENTS

2014/0268161 A1* 9/2014 Arends ................. G06F 3/0386
356/446

* cited by examiner

*Primary Examiner* — Priyank J Shah
(74) *Attorney, Agent, or Firm* — Cai Intellectual Property(USA) Office

(57) ABSTRACT

A pen mouse is provided for controlling a movement of a cursor displayed on a monitor. The pen mouse includes a pen and an optical detection module assembled in the pen. The optical detection module includes a circuit board, two sensors, and a laser emitter, the latter two of which are assembled onto the circuit board. When the pen mouse is moved along a working surface to implement a mouse control motion, the two sensors receive a detection light emitted from the laser emitter and reflected by the working surface, so as to determine whether the mouse control motion is a pen-tilted motion or a pen-spinning motion, thereby compensating the movement of the cursor.

20 Claims, 16 Drawing Sheets

PEN MOUSE

FIELD OF THE DISCLOSURE

The present disclosure relates to a computer mouse, and more particularly to a pen mouse.

BACKGROUND OF THE DISCLOSURE

When a conventional pen mouse is used, unintentional movement of a cursor is often caused by a non-linear motion (e.g., a pen-tilted motion or a pen-spinning motion) of the conventional pen mouse, and the structural configuration of the conventional pen mouse cannot be used to improve on the above issues.

SUMMARY OF THE DISCLOSURE

In response to the above-referenced technical inadequacies, the present disclosure provides a pen mouse for effectively improving on the issues associated with conventional pen mice.

In one aspect, the present disclosure provides a pen mouse for controlling a movement of a cursor displayed on a monitor. The pen mouse includes a pen and an optical detection module. The pen includes a pen body and a pen point portion that is arranged at an end of the pen body. The pen body defines a longitudinal direction and has at least one light-permeable portion arranged adjacent to the penpoint portion. The pen mouse is configured to implement a cursor control motion by using the penpoint portion to move on a working surface. The optical detection module is assembled in the pen body and includes a circuit board, a first sensor, a second sensor, and at least one laser emitter. The first sensor and the second sensor are assembled on the circuit board and face toward the at least one light-permeable portion. The at least one laser emitter is assembled on the circuit board and faces toward the at least one light-permeable portion. When the longitudinal direction of the pen is perpendicular to the working surface, the at least one laser emitter is configured to emit a detection light passing through the at least one light-permeable portion, the first sensor receives the detection light that travels along a first light path by being reflected from the working surface to pass through the at least one light-permeable portion, and the second sensor receives the detection light that travels along a second light path by being reflected from the working surface to pass through the at least one light-permeable portion. The first light path and the second light path have different lengths. When the pen mouse is operated to implement the cursor control motion, the first sensor obtains a first counts per inch (CPI) by receiving the detection light, and the second sensor obtains a second CPI by receiving the detection light. Moreover, when the first CPI is not within a range from −30% to 30% of the second CPI, the cursor control motion is defined as a pen-tilted motion for compensating the movement of the cursor.

In certain embodiments, when the pen mouse is operated to implement the cursor control motion, the first sensor obtains a first trace by receiving the detection light, and the second sensor obtains a second trace by receiving the detection light. When a direction of the first trace is different from a direction of the second trace, the cursor control motion is defined as a pen-spinning motion for compensating the movement of the cursor.

In certain embodiments, the at least one laser emitter includes a laser diode and an optical lens that covers the laser diode. The optical lens is configured to collimate light emitted from the laser diode to form the detection light that has a lighting angle within a range from 0 degrees to 10 degrees.

In certain embodiments, a light emitting surface of the laser diode is spaced apart from the optical lens along the longitudinal direction by a spacing that is within a range from 0.1 mm to 1 mm.

In certain embodiments, each of the first sensor and the second sensor has a light receiving surface, and at least one of the first sensor and the second sensor has a flat transparent layer covering the light receiving surface so as to enable the first light path and the second light path to have different lengths.

In certain embodiments, a quantity of the at least one laser emitter is one.

In certain embodiments, along the longitudinal direction, a light receiving surface of the first sensor and a light receiving surface of the second sensor have different heights with respect to the circuit board so as to enable the first light path and the second light path to have different lengths.

In certain embodiments, a quantity of the at least one laser emitter is two, and the two laser emitters are respectively defined as a first laser emitter and a second laser emitter. The first sensor is configured to receive a first detection light emitted from the first laser emitter, and the second sensor is configured to receive a second detection light emitted from the second laser emitter.

In certain embodiments, the optical detection module further includes a barrier, the first laser emitter and the first sensor are located at one side of the barrier, and the second laser emitter and the second sensor are located at another side of the barrier.

In certain embodiments, along the longitudinal direction, the pen has a pen length, and the optical detection module is spaced apart from the penpoint portion by an arrangement distance that is within a range from 3% to 30% of the pen length.

In another aspect, the present disclosure provides a pen mouse for controlling a movement of a cursor displayed on a monitor. The pen mouse includes a pen and an optical detection module. The pen includes a pen body and a penpoint portion that is arranged at an end of the pen body. The pen body defines a longitudinal direction and has at least one light-permeable portion arranged adjacent to the penpoint portion. The pen mouse is configured to implement a cursor control motion by using the penpoint portion to move on a working surface. The optical detection module is assembled in the pen body and includes a circuit board, a first sensor, a second sensor, and at least one laser emitter. The first sensor and the second sensor are assembled on the circuit board and face toward the at least one light-permeable portion. The at least one laser emitter is assembled on the circuit board and faces toward the at least one light-permeable portion. When the longitudinal direction of the pen is perpendicular to the working surface, the at least one laser emitter is configured to emit a detection light passing through the at least one light-permeable portion, the first sensor receives the detection light that travels along a first light path by being reflected from the working surface to pass through the at least one light-permeable portion, and the second sensor receives the detection light that travels along a second light path by being reflected from the working surface to pass through the at least one light-permeable portion. When the pen mouse is operated to implement the cursor control motion, the first sensor obtains a first trace by receiving the detection light, and the second sensor obtains a second trace by receiving the detection light. When a direction of the first trace is different from a direction of the second trace, the cursor control motion is defined as a pen-spinning motion for compensating the movement of the cursor.

In certain embodiments, the first light path and the second light path have different lengths, and the length of the first light path is within a range from 30% to 70% of the length of the second light path.

In certain embodiments, a quantity of the at least one laser emitter is one, each of the first sensor and the second sensor has a light receiving surface, and at least one of the first sensor and the second sensor has a flat transparent layer covering the light receiving surface so as to enable the first light path and the second light path to have different lengths.

In certain embodiments, the optical detection module further includes a barrier, a quantity of the at least one laser emitter is two, and the two laser emitters are respectively defined as a first laser emitter and a second laser emitter. The first laser emitter and the first sensor are located at one side of the barrier, and the first sensor is configured to receive a first detection light emitted from the first laser emitter. The second laser emitter and the second sensor are located at another side of the barrier, and the second sensor is configured to receive a second detection light emitted from the second laser emitter.

In certain embodiments, the at least one laser emitter includes a laser diode and an optical lens that covers the laser diode. Moreover, a light emitting surface of the laser diode is spaced apart from the optical lens along the longitudinal direction by a spacing that is within a range from 0.1 mm to 1 mm, so as to enable the optical lens to collimate light emitted from the laser diode to form the detection light that has a lighting angle within a range from 0 degrees to 10 degrees.

In yet another aspect, the present disclosure provides a pen mouse for controlling a movement of a cursor displayed on a monitor. The pen mouse includes a pen and an optical detection module. The pen includes a pen body and a penpoint portion that is arranged at an end of the pen body. The pen body defines a longitudinal direction and has at least one light-permeable portion arranged adjacent to the penpoint portion. The pen mouse is configured to implement a cursor control motion by using the penpoint portion to move on a working surface. The optical detection module is assembled in the pen body and includes a first circuit board, a second circuit board, a first sensor, a second sensor, a first laser emitter, and a second laser emitter. The second circuit board is spaced apart from the first circuit board. The first sensor and the second sensor are respectively assembled on the first circuit board and the second circuit board. The first sensor and the second sensor face toward the at least one light-permeable portion. The first laser emitter and the second laser emitter are respectively assembled on the first circuit board and the second circuit board. The first laser emitter and the second laser emitter face toward the at least one light-permeable portion. When the longitudinal direction of the pen is perpendicular to the working surface, the first laser emitter and the second laser emitter are configured to respectively emit a first detection light and a second detection light both passing through the at least one light-permeable portion, the first sensor is able to receive the first detection light that travels along a first light path by being reflected from the working surface to pass through the at least one light-permeable portion, and the second sensor is able to receive the second detection light that travels along a second light path by being reflected from the working surface to pass through the at least one light-permeable portion. The first light path and the second light path have different lengths. When the pen mouse is operated to implement the cursor control motion, the first sensor obtains a first counts per inch (CPI) by receiving the first detection light, and the second sensor obtains a second CPI by receiving the second detection light. When the first CPI is not within a range from −30% to 30% of the second CPI, the cursor control motion is defined as a pen-tilted motion for compensating the movement of the cursor.

In certain embodiments, along the longitudinal direction, the first circuit board is spaced apart from the penpoint portion by a first arrangement distance, and the first circuit board is spaced apart from the penpoint portion by a second arrangement distance different from the first arrangement distance so as to enable the first light path and the second light path to have different lengths.

In certain embodiments, along the longitudinal direction, the pen has a pen length, the first arrangement distance is within a range from 5% to 20% of the pen length, and the second arrangement distance is within a range from 20% to 40% of the pen length.

In certain embodiments, the first laser emitter includes a laser diode and an optical lens that covers the laser diode. Moreover, a light emitting surface of the laser diode is spaced apart from the optical lens along the longitudinal direction by a spacing that is within a range from 0.1 mm to 1 mm, so as to enable the optical lens to collimate light emitted from the laser diode to form the first detection light that has a lighting angle within a range from 0 degrees to 10 degrees.

In certain embodiments, when the pen mouse is operated to implement the cursor control motion, the first sensor obtains a first trace by receiving the first detection light, and the second sensor obtains a second trace by receiving the second detection light. When a direction of the first trace is different from a direction of the second trace, the cursor control motion is defined as a pen-spinning motion for compensating the movement of the cursor.

Therefore, in the pen mouse provided by the present disclosure, the optical detection module and the pen can be jointly cooperated with each other to effectively determine a non-linear motion (e.g., the pen-tilted motion or the pen-spinning motion) of the pen mouse for enabling an operational accuracy of the pen mouse to be increased by compensating the movement of the cursor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
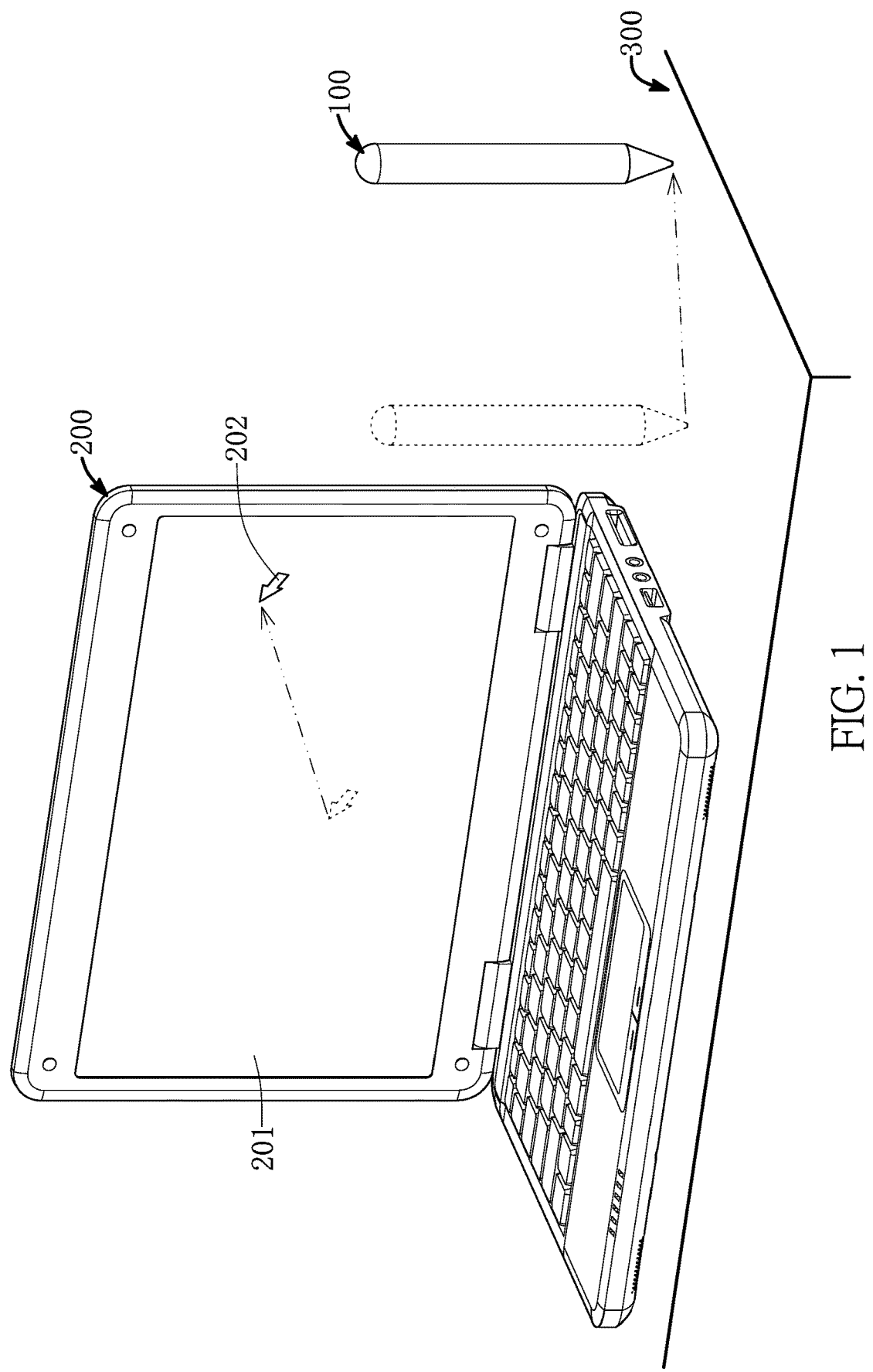
FIG. 1 is a schematic perspective view of a pen mouse in a linear motion according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 9, a first embodiment of the present disclosure is provided. As shown in FIG. 1 to FIG. 4, the present embodiment provides a pen mouse 100 (or a stylus 100) configured for controlling a movement of a cursor 202 displayed on a monitor 201 (or a screen 201). In other words, the pen mouse 100 is wirelessly connected to an electronic apparatus 200 (e.g., a desktop computer, a tablet computer, or a notebook computer) having the monitor 201, so that the movement of the cursor 202 can be controlled by the pen mouse 100.

The pen mouse 100 includes a pen 1 and an optical detection module 2 that is assembled in the pen 1. The pen 1 is designed for allowing a user to hold conveniently, and a specific structure or function of the pen 1 can be changed or adjusted according to design requirements (e.g., the pen 1 can be provided with or without a writing function), but the present disclosure is not limited thereto.

The pen 1 includes a pen body 11, a penpoint portion 12 arranged at an end of the pen body 11, and an operation module 13 that is assembled in the pen body 11. The pen body 11 defines a longitudinal direction L, and the pen body 11 has a pen length L1 along the longitudinal direction L. The pen body 11 has at least one light-permeable portion 111 arranged adjacent to the penpoint portion 12.

In the present embodiment, a quantity of the at least one light-permeable portion 111 is one, and the light-permeable portion 111 is a front end portion of the pen body 11 and surrounds the penpoint portion 12, but the present disclosure is not limited thereto. For example, in other embodiments of the present disclosure not shown in the drawings, the light-permeable portion 111 can be at least one thru-hole, and a quantity of the at least one thru-hole of the light-permeable portion 111 can be more than one (e.g., the front end portion has a plurality of thru-holes).

The pen mouse 100 is configured to implement a cursor control motion by using the penpoint portion 12 to move on a working surface 300 (e.g., a desktop or a mouse pad). In other words, a motion of the pen mouse 100 on the working surface 300 is defined as the cursor control motion, and the pen mouse 100 can be used to implement an existing function through the operation module 13 (e.g., the pen mouse 100 can be wirelessly connected to the electronic apparatus 200 and control the movement of the cursor 202 through the operation module 13). For example, the operation module 13 can include a processor and a wireless connection component.

The optical detection module 2 is assembled in the pen body 11. Moreover, the optical detection module 2 is spaced apart from the penpoint portion 12 along the longitudinal direction L by an arrangement distance L21 that is preferably within a range from 3% to 30% of the pen length L1, thereby facilitating the operation of the optical detection module 2, but the present disclosure is not limited thereto.

The optical detection module 2 includes a circuit board 21, a first sensor 22, a second sensor 23, and a laser emitter 24. The circuit board 21 is fixed in the pen body 11, and a board surface of the circuit board 21 is substantially perpendicular to the longitudinal direction L. Moreover, the circuit board 21 is electrically coupled to the operation module 13, such that the operation module 13 can be used to compensate the movement of the cursor 202 according to a detection result of the optical detection module 2.

The first sensor 22, the second sensor 23, and the laser emitter 24 are assembled onto the circuit board 21 and face toward the light-permeable portion 11 (or the penpoint portion 12), and the first sensor 22 and the second sensor 23 are spaced apart from the laser emitter 24 by substantially a same distance. In the present embodiment, the laser emitter 24 includes a laser diode 241 and an optical lens 242 that covers the laser diode 241. The optical lens 242 is configured to collimate light emitted from the laser diode 241 to form the detection light B that has a lighting angle 624 being within a range from 0 degrees to 10 degrees. Moreover, a light emitting surface 2411 of the laser diode 241 is spaced apart from the optical lens 242 along the longitudinal direction L by a spacing S that is within a range from 0.1 mm to 1 mm, thereby facilitating the formation of the lighting angle 24 of the detection light B, but the present disclosure is not limited thereto.

Accordingly, when the longitudinal direction L of the pen 1 is perpendicular to the working surface 300, the laser emitter 24 is configured to emit the detection light B passing through the light-permeable portion 111, the first sensor 22 receives the detection light B that travels along a first light path by being reflected from the working surface 300 to pass through the light-permeable portion 111, and the second sensor 23 receives the detection light B that travels along a second light path by being reflected from the working surface 300 to pass through the light-permeable portion 111. Moreover, the first light path and the second light path have different lengths, and the first light path can be within a range from 30% to 70% of the second light path. Specifically, a traveling distance of the detection light B from the laser emitter 24 to a light receiving surface 221 of the first sensor 22 (or a light receiving surface 231 of the second sensor 22) is defined as the first light path (or the second light path).

Figure 3:
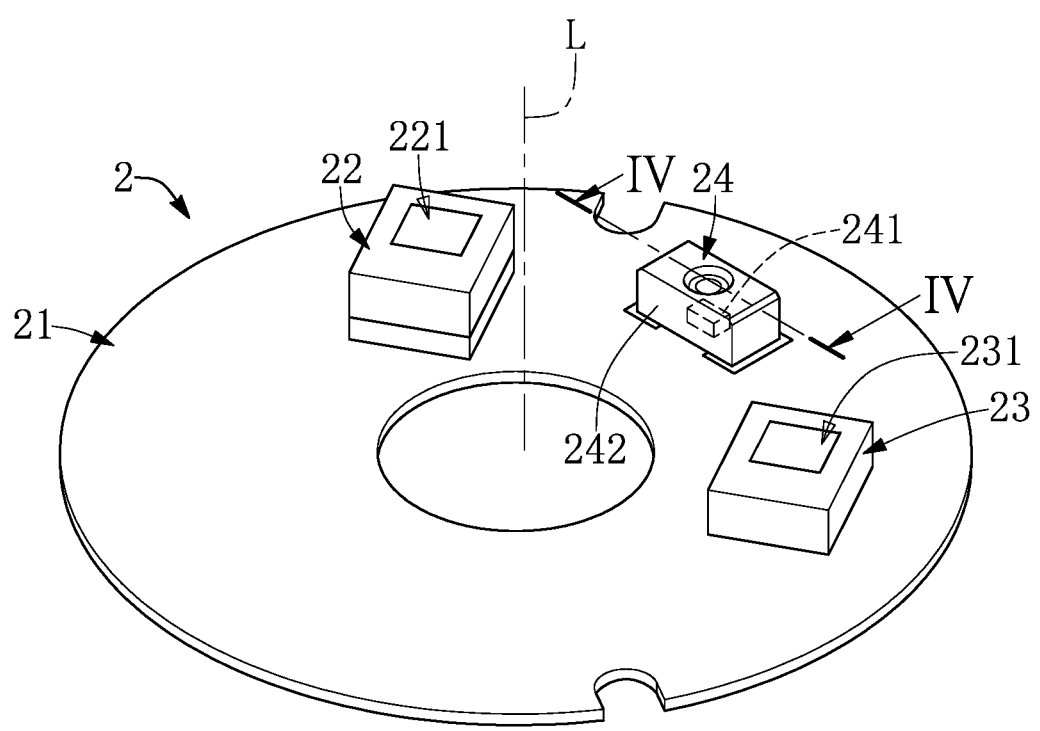
FIG. 3 is a schematic perspective view showing an optical detection module of the pen mouse of FIG. 2.

It should be noted that implementation of the first light path and the second light path having different lengths can be changed or adjusted according to design requirements. For example, as shown in FIG. 3, along the longitudinal direction L, the light receiving surface 221 of the first sensor 22 and the light receiving surface 231 of the second sensor 22 are respectively located at different heights with respect to the circuit board 21, so that the first light path is different from the second light path.

Figure 5:
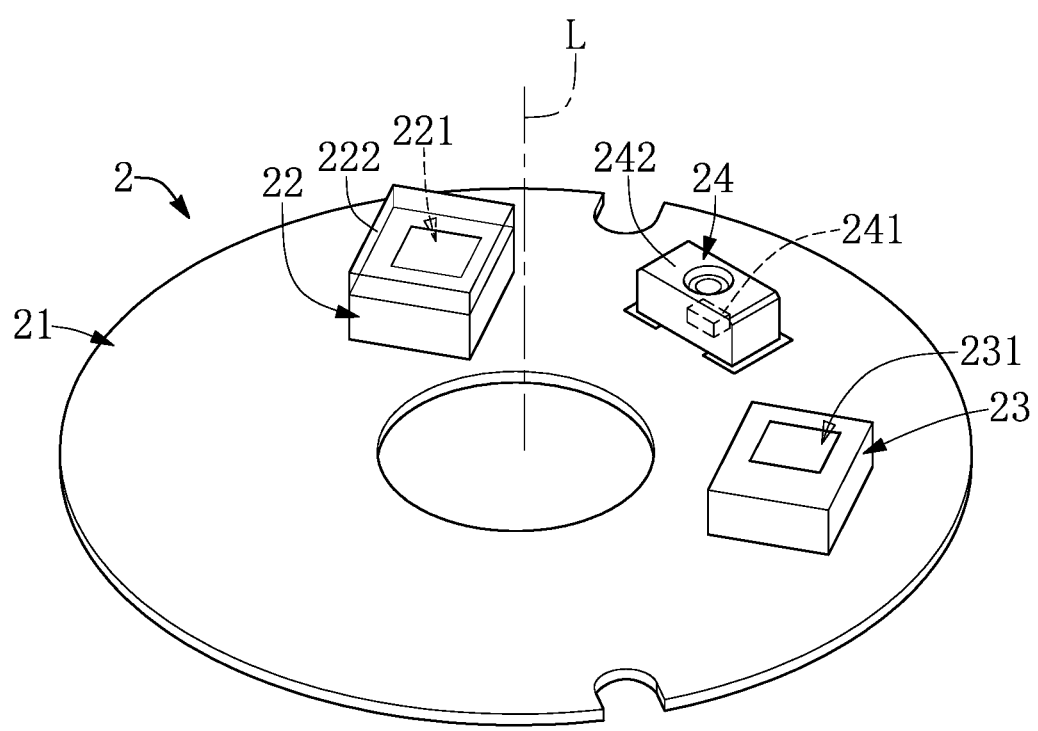
FIG. 5 is a schematic perspective view showing the optical detection module of the pen mouse in another configuration.

Or, as shown in FIG. 5, at least one of the first sensor 22 and the second sensor 23 (e.g., the first sensor 22) has a flat transparent layer 222 covering the light receiving surface 221 so as to enable the first light path and the second light path to have different lengths, thereby allowing the light receiving surface 221 of the first sensor 22 and the light receiving surface 231 of the second sensor 22 to be coplanar with each other or to be arranged at different heights.

Figure 6:
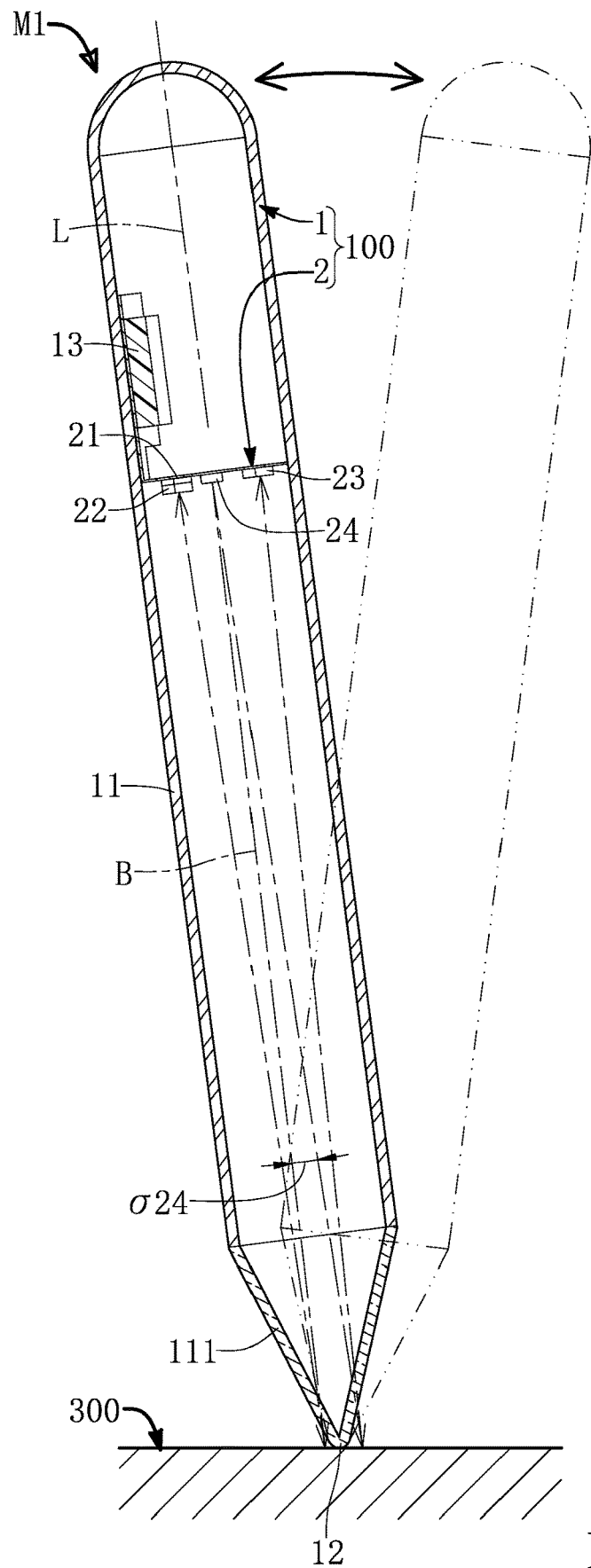
FIG. 6 is a schematic cross-sectional view showing the pen mouse in a pen-tilted motion according to the first embodiment of the present disclosure.

In summary, as shown in FIG. 6, when the pen mouse 100 is operated to implement the cursor control motion, the first sensor 22 obtains a first counts per inch (CPI) by receiving the detection light B, and the second sensor 23 obtains a second CPI by receiving the detection light B. Moreover, when the first CPI is not within a range from −30% to 30% of the second CPI, the cursor control motion is defined as a pen-tilted motion M1 for compensating the movement of the cursor 202.

Figure 2:
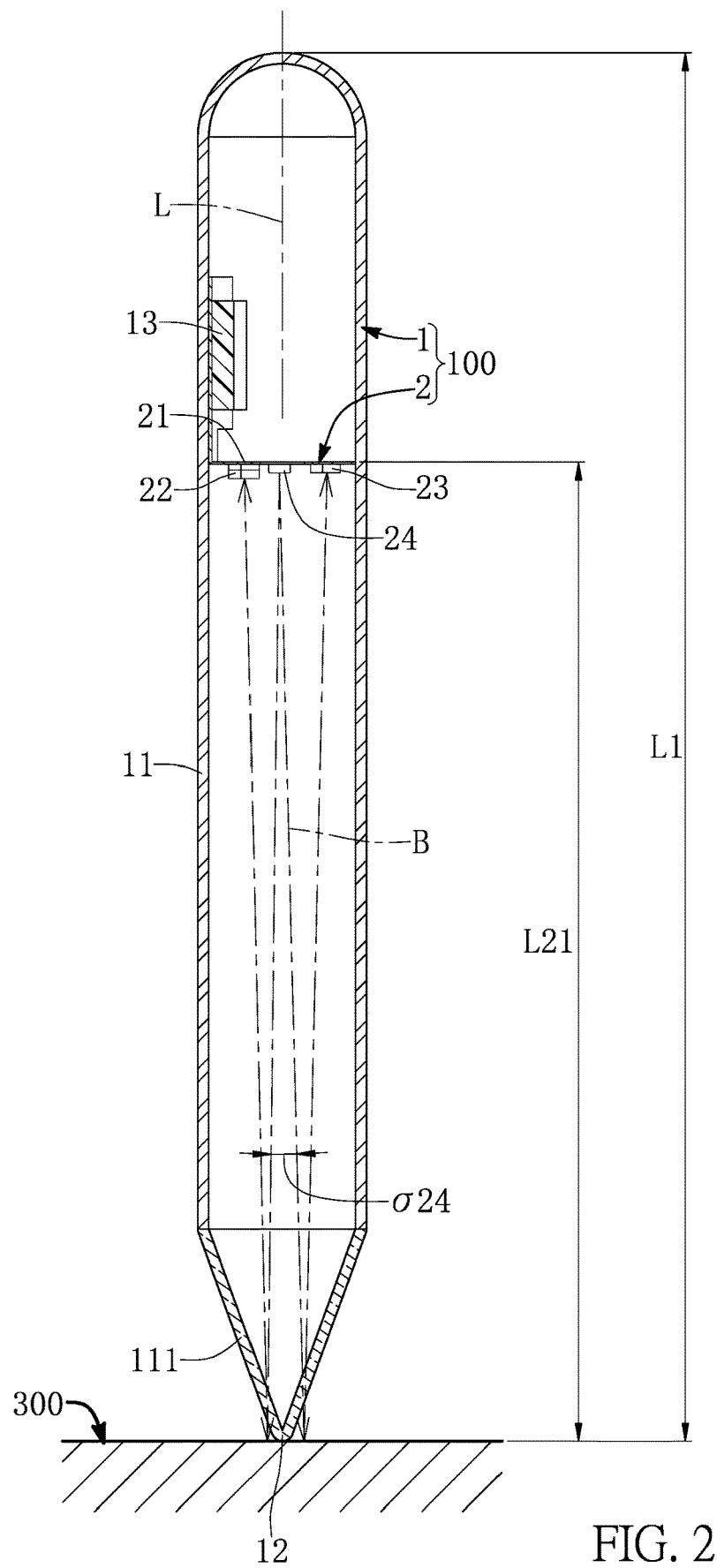
FIG. 2 is a schematic cross-sectional view showing the pen mouse of FIG. 1.

In other words, as shown in FIG. 1 and FIG. 2, when the pen mouse 100 is linearly moved on the working surface 300 without changing an angle thereof, the first CPI of the first sensor 22 should be close to the second CPI of the second sensor 23. Moreover, according to a simulation experiment, if a difference between the first CPI and the second CPI (e.g., the first CPI is not within a range from −30% to 30% of the second CPI), the cursor control motion can be determined as follows: the penpoint portion 12 on the working surface 300 does not have a large displacement, and the pen body 11 has a slanting motion or a swing motion that is defined as the pen-tilted motion M1 (as shown in FIG. 6).

Figure 7:
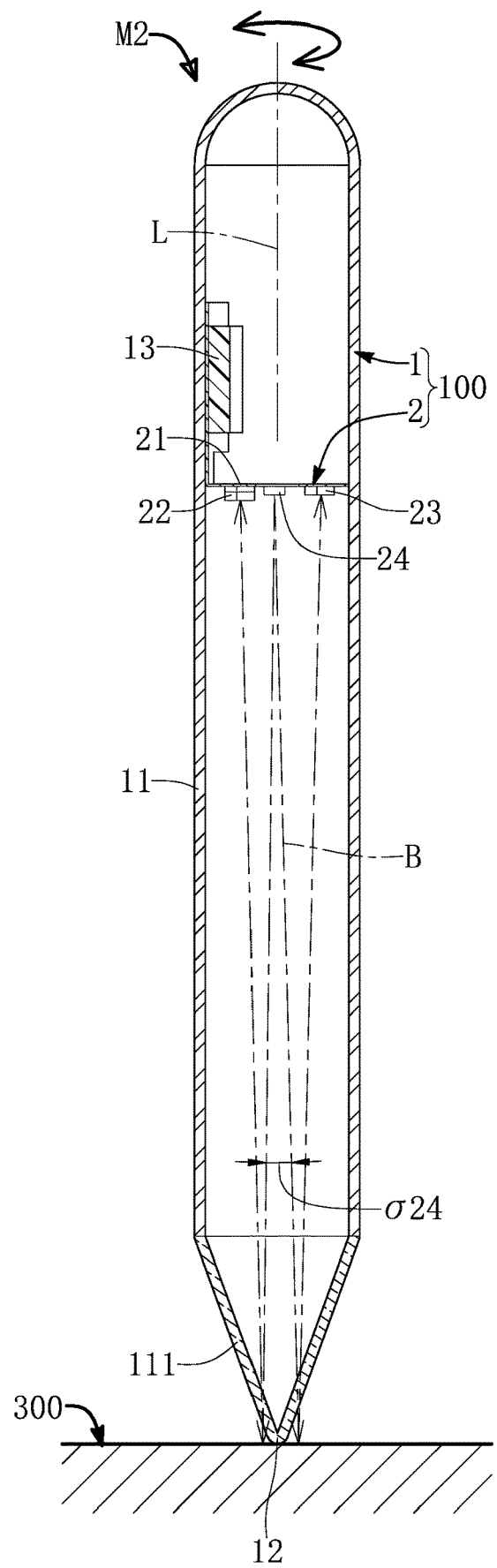
FIG. 7 is a schematic cross-sectional view showing the pen mouse in a pen-spinning motion according to the first embodiment of the present disclosure.
Figure 8:
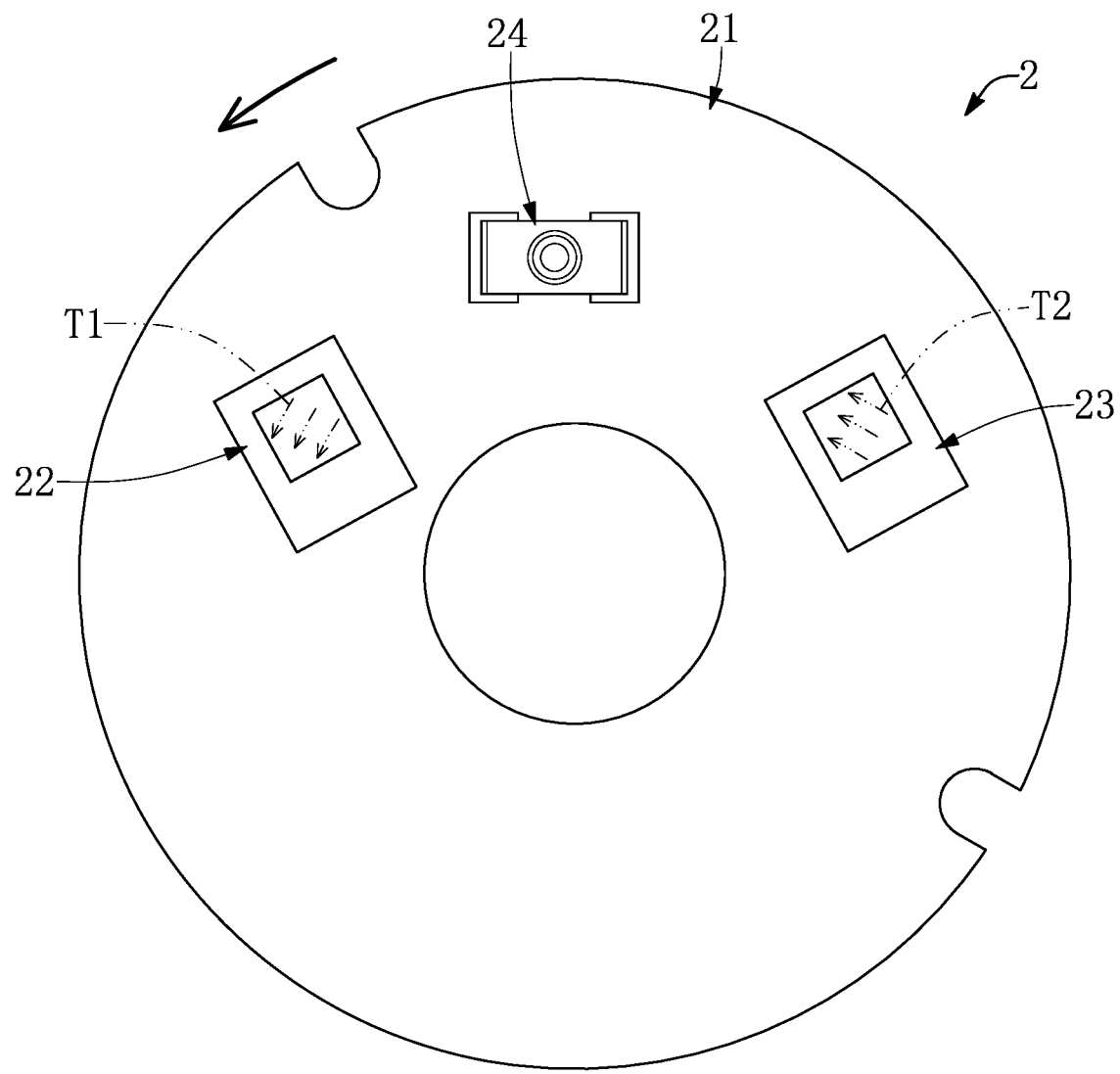
FIG. 8 is a schematic view showing the optical detection module in operation of FIG. 7.

Moreover, as shown in FIG. 7 and FIG. 8, when the pen mouse 100 is operated to implement the cursor control motion, the first sensor 22 obtains a first trace T1 by receiving the detection light B, and the second sensor 23 obtains a second trace T2 by receiving the detection light B. Moreover, when a direction of the first trace T1 is different from a direction of the second trace T2, the cursor control motion is defined as a pen-spinning motion M2 for compensating the movement of the cursor 202.

Figure 9:
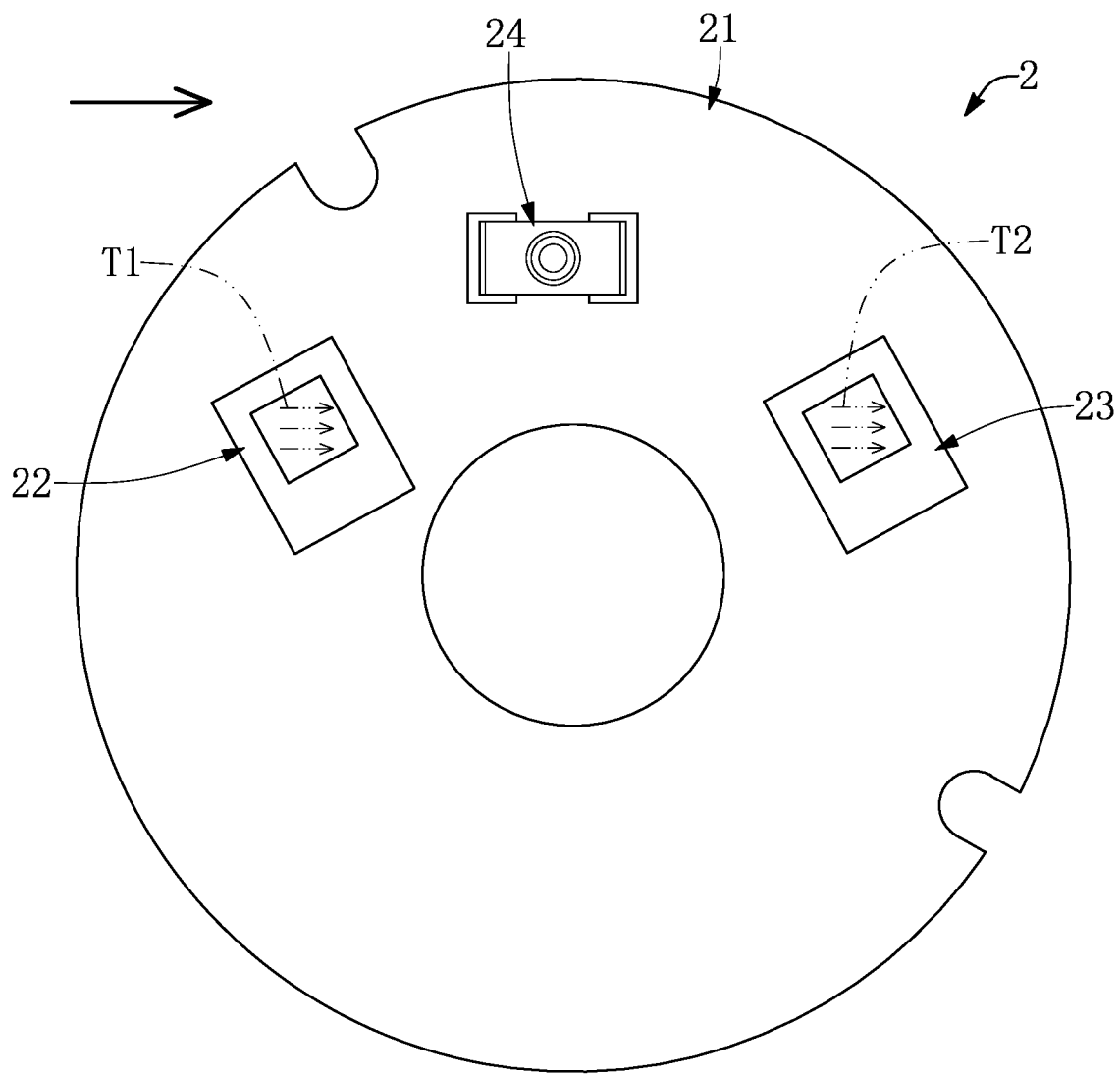
FIG. 9 is a schematic view showing the optical detection module in operation of FIG. 1.

In other words, as shown in FIG. 1 and FIG. 9, when the pen mouse 100 is linearly moved on the working surface 300 without changing an angle thereof, the direction of the first trace T1 obtained by the first sensor 22 should be identical to the direction of the second trace T2 obtained by the second sensor 23 (e.g., the direction of the first trace T1 and the direction of the first trace T1 face toward a right side shown in FIG. 9). Moreover, according to a simulation experiment, if the direction of the first trace T1 obtained by the first sensor 22 is different from the direction of the second trace T2 obtained by the second sensor 23, the cursor control motion can be determined as follows: the penpoint portion 12 on the working surface 300 does not have a large displacement, and the pen body 11 has a spinning motion that is defined as the pen-spinning motion M2 (as shown in FIG. 7).

In summary, as shown in FIG. 1 to FIG. 9, in the pen mouse 100 provided by the present embodiment, the optical detection module 2 and the pen 1 can be jointly cooperated with each other to effectively determine a non-linear motion (e.g., the pen-tilted motion M1 or the pen-spinning motion M2) of the pen mouse 100 for enabling an operational accuracy of the pen mouse 100 to be increased by compensating the movement of the cursor 202.

It should be noted that the pen mouse 100 in the present embodiment can be used to determine whether the cursor control motion is the pen-tilted motion M1 and can be used to determine whether the cursor control motion is the pen-spinning motion M2, thereby effectively compensating the movement of the cursor 202, but the present disclosure is not limited thereto. For example, in other embodiments of the present disclosure not shown in the drawings, the pen mouse 100 can be used to only determine whether the cursor control motion is the pen-tilted motion M1; or, the pen mouse 100 can be used to only determine whether the cursor control motion is the pen-spinning motion M2, and the first light path can be equal to the second light path.

Second Embodiment

Figure 10:
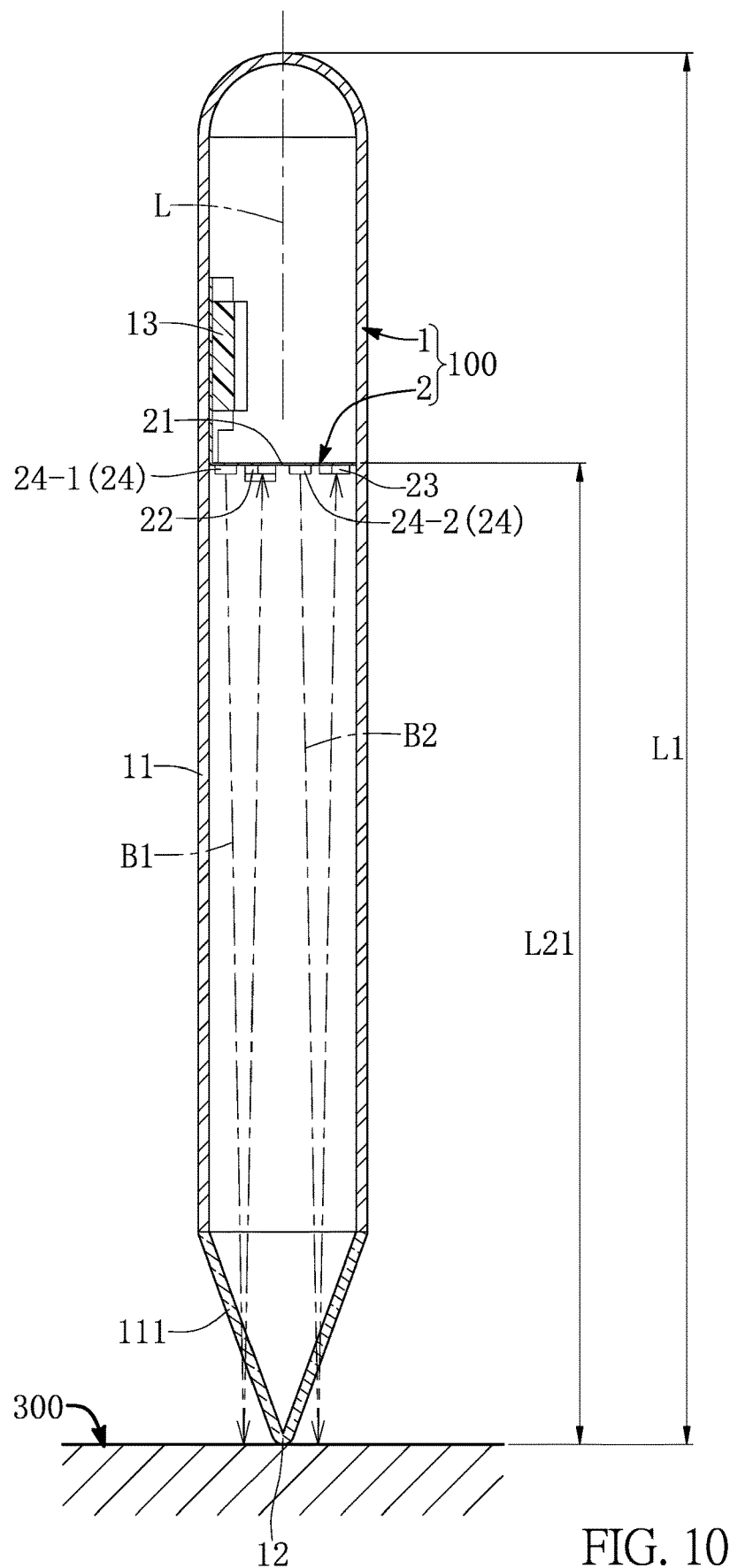
FIG. 10 is a schematic cross-sectional view of the pen mouse according to a second embodiment of the present disclosure.
Figure 11:
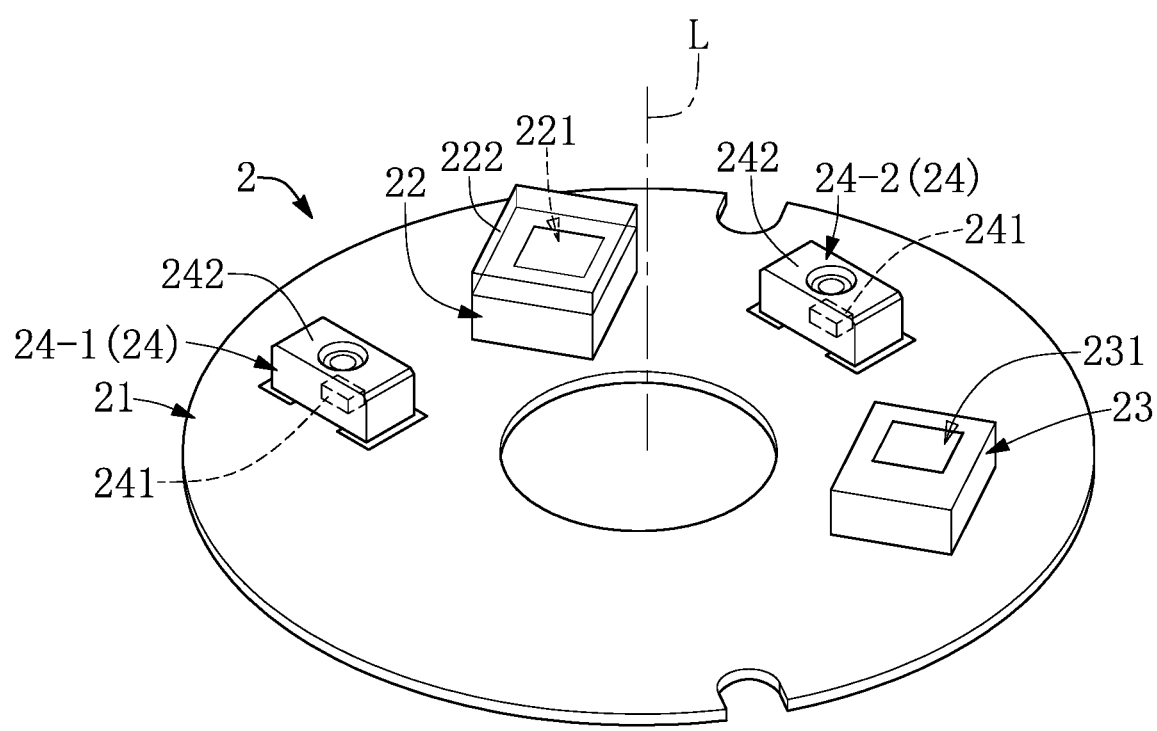
FIG. 11 is a schematic perspective view showing the optical detection module of the pen mouse of FIG. 10.
Figure 12:
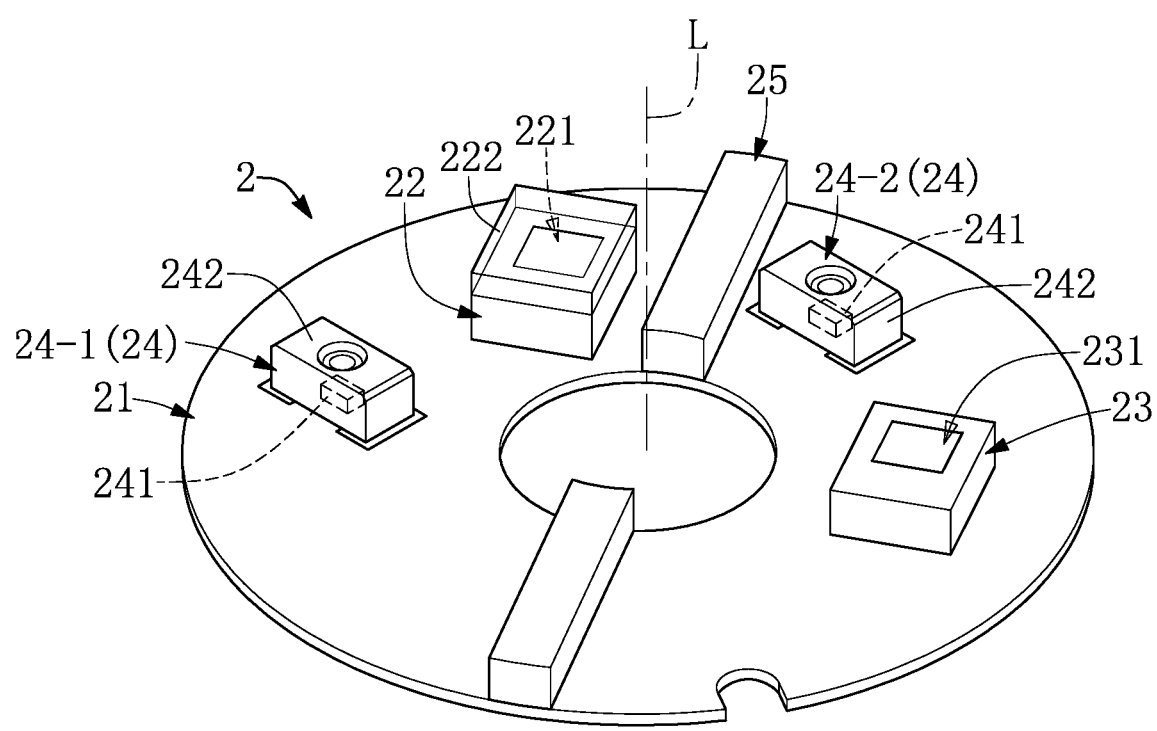
FIG. 12 is a schematic perspective view showing the optical detection module of the pen mouse in another configuration.
Figure 13:
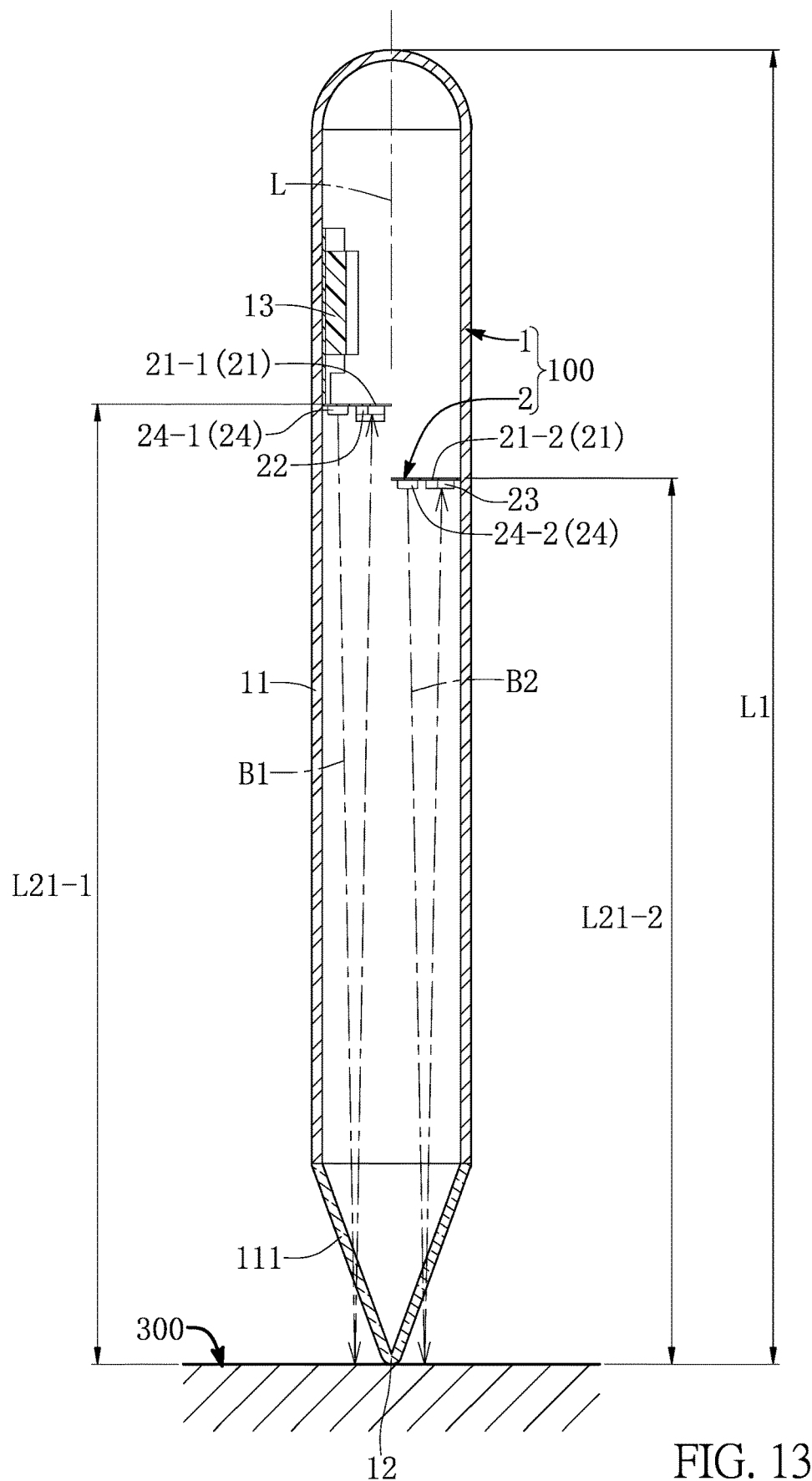
FIG. 13 is a schematic cross-sectional view of the pen mouse according to a third embodiment of the present disclosure.
Figure 14:
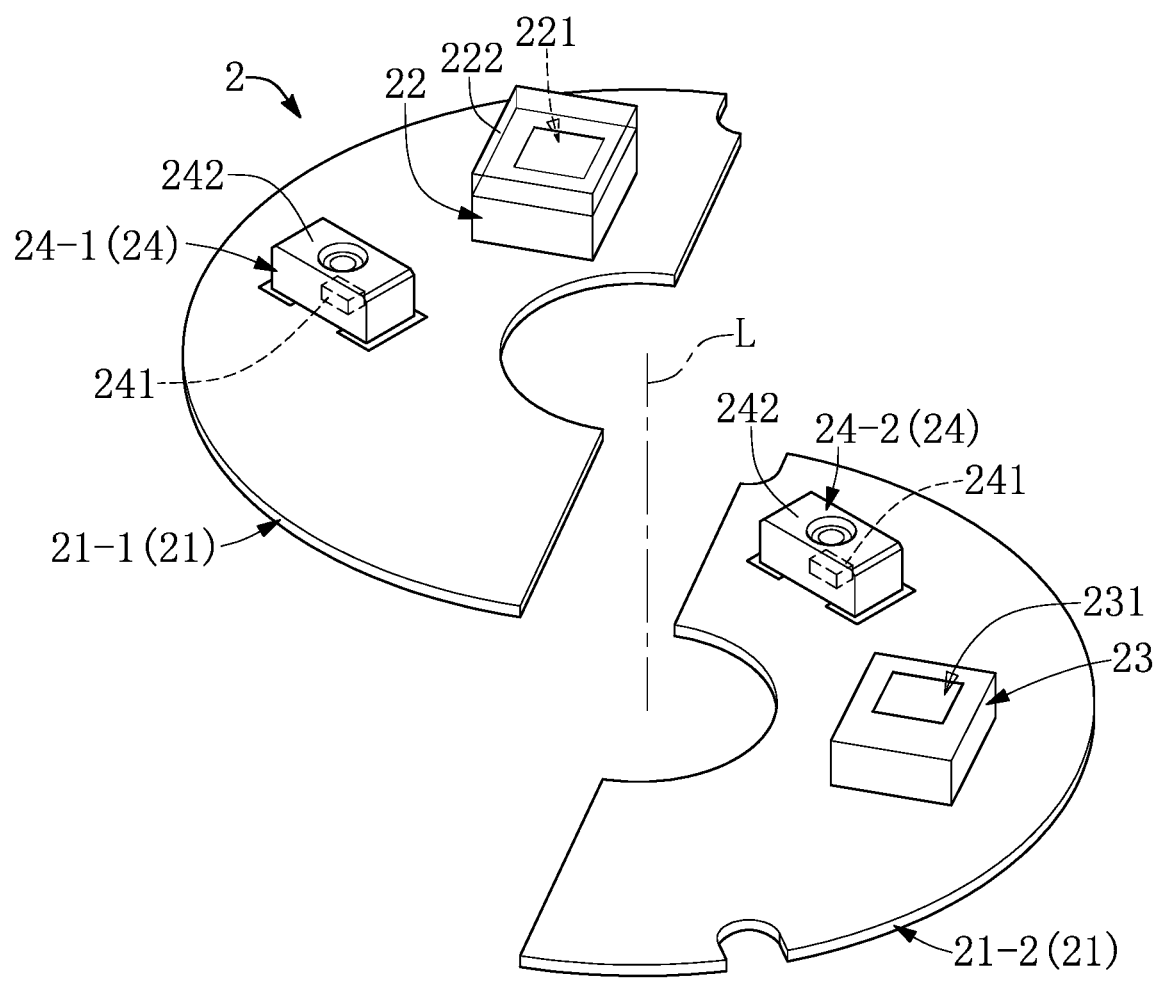
FIG. 14 is a schematic perspective view showing the optical detection module of the pen mouse of FIG. 13.
Figure 15:
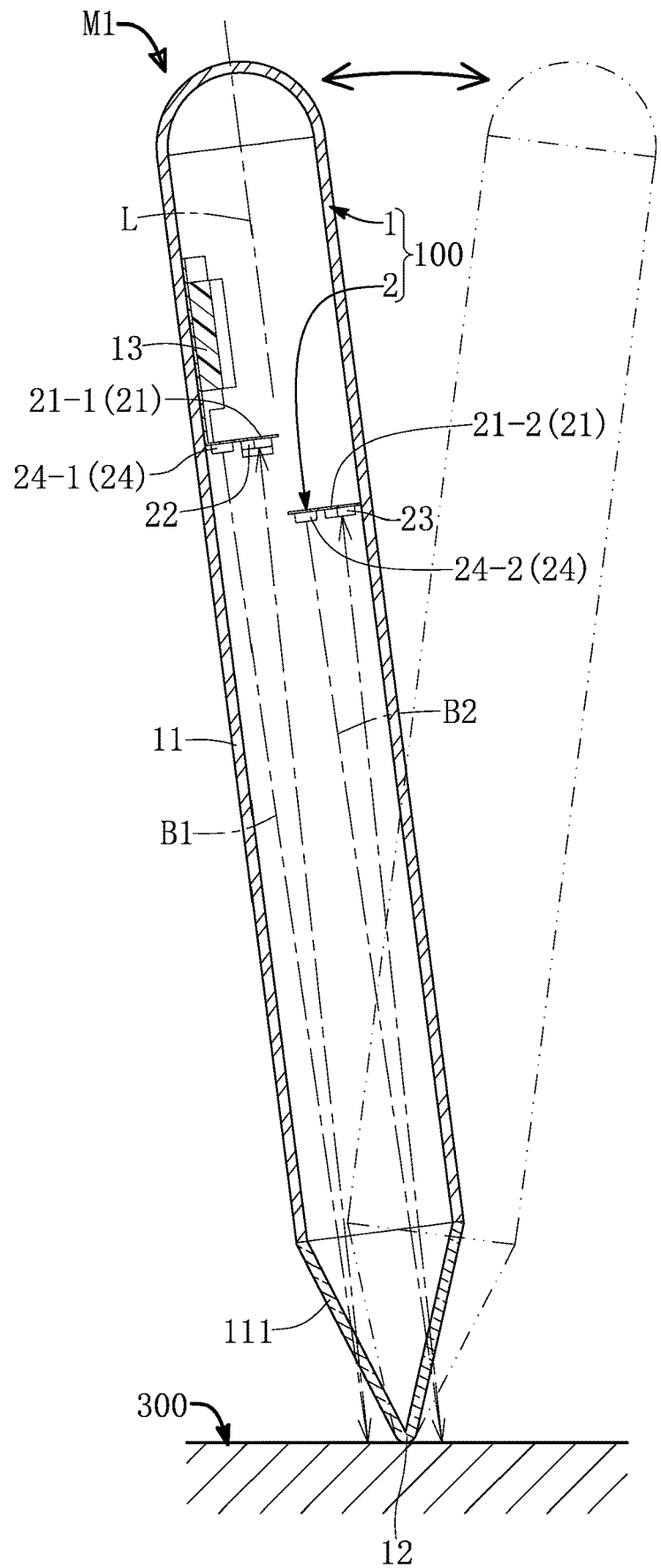
FIG. 15 is a schematic cross-sectional view showing the pen mouse in the pen-tilted motion according to the third embodiment of the present disclosure.
Figure 16:
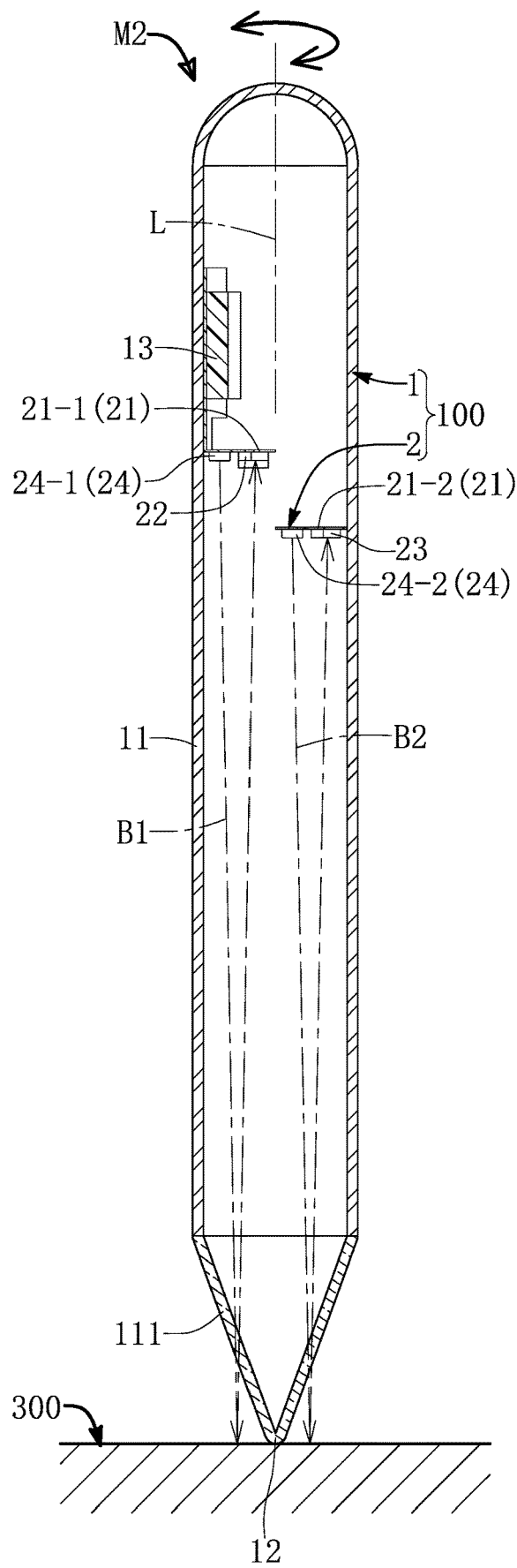
FIG. 16 is a schematic cross-sectional view showing the pen mouse in a pen-spinning motion according to the first embodiment of the present disclosure.

Referring to FIG. 10 to FIG. 12, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

In the present embodiment, a quantity of the laser emitter 24 included by the optical detection module 2 is two, and the two laser emitters 24 are respectively defined as a first laser emitter 24-1 and a second laser emitter 24-2. When the longitudinal direction L of the pen 1 is perpendicular to the working surface 300, the first laser emitter 24-1 and the second laser emitter 24-2 are configured to respectively emit a first detection light B1 and a second detection light B2 both passing through the light-permeable portion 111, the first sensor 22 is able to receive the first detection light B1 that travels along a first light path by being reflected from the working surface 300 to pass through the light-permeable portion 111, and the second sensor 23 is able to receive the second detection light B2 that travels along a second light path by being reflected from the working surface 300 to pass through the light-permeable portion 111. Moreover, the first light path and the second light path have different lengths. Accordingly, the optical detection module 2 in the present embodiment can have a high flexibility of component arrangement by using the two laser emitters 24 to be respectively cooperated with the first sensor 22 and the second sensor 23.

Figure 4:
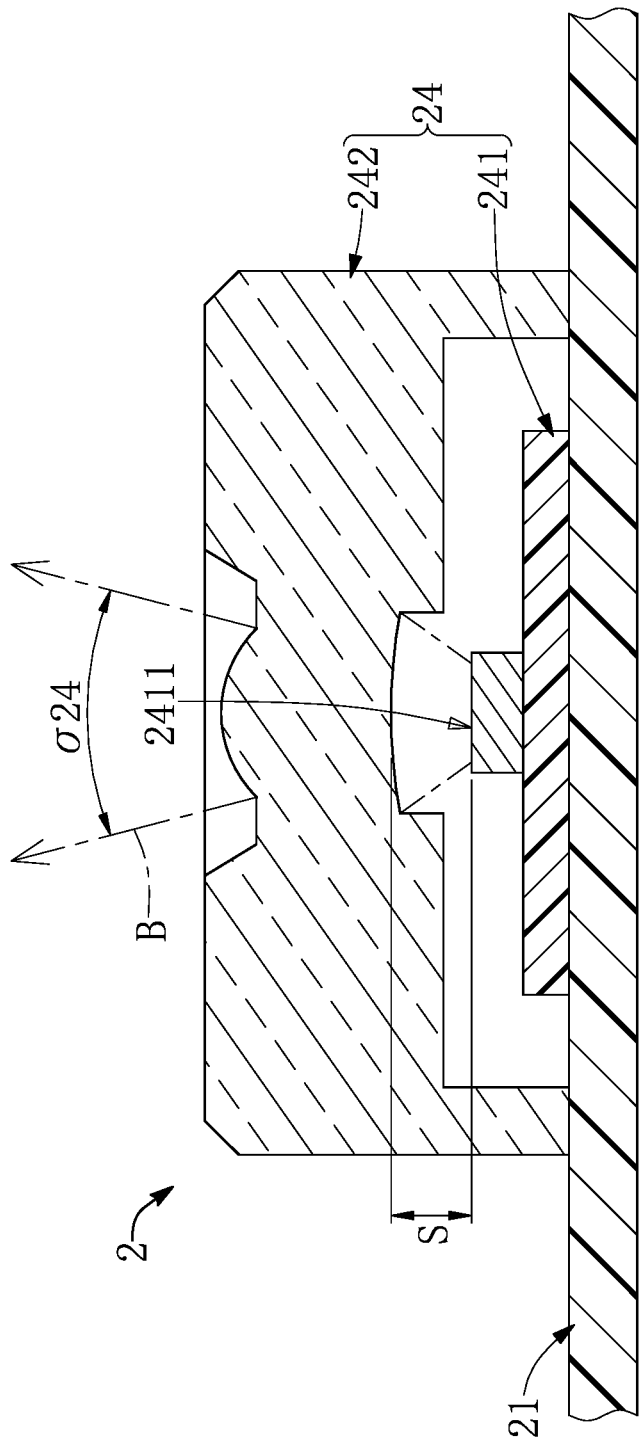
FIG. 4 is a schematic cross-sectional view taken along line IV-IV of FIG. 3.

Specifically, the first laser emitter 24-1 and a second laser emitter 24-2 in the present embodiment can be provided as shown in FIG. 4 of the first embodiment. In other words, each of the first laser emitter 24-1 and a second laser emitter 24-2 includes a laser diode 241 and an optical lens 242 that covers the laser diode 241. Moreover, in any one of the first laser emitter 24-1 and a second laser emitter 24-2, a light emitting surface of the laser diode 241 is spaced apart from the optical lens 242 along the longitudinal direction L by a spacing that is within a range from 0.1 mm to 1 mm, thereby facilitating the formation of a lighting angle of the first detection light B1 (or the second detection light B2) that within a range from 0 degrees to 10 degrees.

Moreover, as shown in FIG. 12, the optical detection module 2 includes a barrier 25, the first laser emitter 24-1 and the first sensor 22 are located at one side of the barrier 25, and the second laser emitter 24-2 and the second sensor 23 are located at another side of the barrier 25. Accordingly, the optical detection module 2 in the present embodiment can be provided to effectively reduce an interference between the two laser emitters 24 by having the barrier 25.

In addition, if components of the optical detection module 2 can be arranged to prevent the first laser emitter 24-1 and the first sensor 22 from affecting the second laser emitter 24-2 and the second sensor 23, the optical detection module 2 can be provided without the barrier 25 (as shown in FIG. 11).

Third Embodiment

Referring to FIG. 13 to FIG. 16, a third embodiment of the present disclosure, which is similar to the second embodiment of the present disclosure, is provided. For the sake of brevity, descriptions of the same components in the second and third embodiments of the present disclosure will be omitted herein, and the following description only discloses different features between the second and third embodiments.

In the present embodiment, a quantity of the circuit board 21 included by the optical detection module 2 is two, the two circuit board 21 are respectively defined as a first circuit board 21-1 and a second circuit board 21-2, and the optical detection module 2 is provided without the barrier. The first circuit board 21-1 and the second circuit board 21-2 are spaced apart from each other, and are preferably not overlapped with each other along the longitudinal direction L.

Moreover, the first sensor 22 and the second sensor 23 are respectively assembled onto the first circuit board 21-1 and the second circuit board 21-2, and face toward the light-permeable portion 111. The first laser emitter 24-1 and the second laser emitter 24-2 are respectively assembled onto the first circuit board 21-1 and the second circuit board 21-2, and face toward the light-permeable portion 111. The first sensor 22 is configured to receive the first detection light B1 emitted from the first laser emitter 24-1, and the second sensor 23 is configured to receive the second detection light B2 emitted from the second laser emitter 24-2.

It should be noted that, along the longitudinal direction L, the first circuit board 21-1 is spaced apart from the penpoint portion 12 by a first arrangement distance L21-1, and the second circuit board 21-2 is spaced apart from the penpoint portion 12 by a second arrangement distance L21-2 (i.e., the first circuit board 21-1 is spaced apart from the second circuit board 21-2 along the longitudinal direction L), so that the first light path is different from (e.g., shorter than) the second light path. Specifically, the first arrangement distance L21-1 is preferably within a range from 5% to 20% of the pen length L1, and the second arrangement distance L21-2 is preferably within a range from 20% to 40% of the pen length L1, but the present disclosure is not limited thereto.

For example, in other embodiments of the present disclosure not shown in the drawings, the first arrangement distance L21-1 can be equal to the second arrangement distance L21-2, and the first light path and the second light path can be different from each other by arranging the light receiving surface 221 of the first sensor 22 and the light receiving surface 231 of the second sensor 23 to be located at different heights, or by providing the flat transparent layer 222 in at least one of the first sensor 22 and the second sensor 23 to cover the corresponding light receiving surface 221, 231.

In summary, when the pen mouse 100 is operated to implement the cursor control motion, the first sensor 22 obtains a first CPI by receiving the first detection light B1, and the second sensor 23 obtains a second CPI by receiving the second detection light B2. Moreover, when the first CPI is not within a range from −30% to 30% of the second CPI, the cursor control motion is defined as a pen-tilted motion M1 for compensating the movement of the cursor 202.

Moreover, when the pen mouse 100 is operated to implement the cursor control motion, the first sensor 22 obtains a first trace by receiving the first detection light B1, and the second sensor 23 obtains a second trace by receiving the second detection light B2. Moreover, when a direction of the first trace is different from a direction of the second trace, the cursor control motion is defined as a pen-spinning motion M2 for compensating the movement of the cursor 202.

It should be noted that the pen mouse 100 in the present embodiment can be used to determine whether the cursor control motion is the pen-tilted motion M1 and can be used to determine whether the cursor control motion is the pen-spinning motion M2, thereby effectively compensating the movement of the cursor 202, but the present disclosure is not limited thereto. For example, in other embodiments of the present disclosure not shown in the drawings, the pen mouse 100 can be used to only determine whether the cursor control motion is the pen-tilted motion M1.

Beneficial Effects of the Embodiments

In conclusion, in the pen mouse provided by the present disclosure, the optical detection module and the pen can be jointly cooperated with each other to effectively determine a non-linear motion (e.g., the pen-tilted motion or the pen-spinning motion) of the pen mouse for enabling an operational accuracy of the pen mouse to be increased by compensating the movement of the cursor.

Specifically, the optical detection module in the present disclosure can have a high flexibility of component arrangement by using the two laser emitters to be respectively cooperated with the first sensor and the second sensor, and the optical detection module in the present disclosure can be provided to effectively reduce an interference between the two laser emitters by having the barrier.

Moreover, the optical detection module in the present disclosure can be provided to further increase the flexibility of the component arrangement by having the two circuit boards (e.g., the first circuit board and the second circuit board are spaced apart from each other along the longitudinal direction so as to enable the first light path to be different from the second light path).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A pen mouse for controlling a movement of a cursor displayed on a monitor, the pen mouse comprising:
   a pen including a pen body and a pen point portion that is arranged at an end of the pen body, wherein the pen body defines a longitudinal direction and has at least one light-permeable portion arranged adjacent to the penpoint portion, and wherein the pen mouse is configured to implement a cursor control motion by using the penpoint portion to move on a working surface; and
   an optical detection module assembled in the pen body and including:
      a circuit board;
      a first sensor and a second sensor both assembled on the circuit board and facing toward the at least one light-permeable portion; and
      at least one laser emitter assembled on the circuit board and facing toward the at least one light-permeable portion;
      wherein, when the longitudinal direction of the pen is perpendicular to the working surface, the at least one laser emitter is configured to emit a detection light passing through the at least one light-permeable portion, the first sensor receives the detection light that travels along a first light path by being reflected from the working surface to pass through the at least one light-permeable portion, and the second sensor receives the detection light that travels along a second light path by being reflected from the working surface to pass through the at least one light-permeable portion, and wherein the first light path and the second light path have different lengths;
   wherein, when the pen mouse is operated to implement the cursor control motion, the first sensor obtains a first counts per inch (CPI) by receiving the detection light, and the second sensor obtains a second CPI by receiving the detection light; and wherein, when the first CPI is not within a range from −30% to 30% of the second CPI, the cursor control motion is defined as a pen-tilted motion for compensating the movement of the cursor.

2. The pen mouse according to claim 1, wherein, when the pen mouse is operated to implement the cursor control motion, the first sensor obtains a first trace by receiving the detection light, and the second sensor obtains a second trace by receiving the detection light; and wherein, when a direction of the first trace is different from a direction of the second trace, the cursor control motion is defined as a pen-spinning motion for compensating the movement of the cursor.

3. The pen mouse according to claim 1, wherein the at least one laser emitter includes a laser diode and an optical lens that covers the laser diode, and wherein the optical lens is configured to collimate light emitted from the laser diode to form the detection light that has a lighting angle within a range from 0 degrees to 10 degrees.

4. The pen mouse according to claim 3, wherein a light emitting surface of the laser diode is spaced apart from the optical lens along the longitudinal direction by a spacing that is within a range from 0.1 mm to 1 mm.

5. The pen mouse according to claim 1, wherein each of the first sensor and the second sensor has a light receiving surface, and at least one of the first sensor and the second sensor has a flat transparent layer covering the light receiving surface so as to enable the first light path and the second light path to have different lengths.

6. The pen mouse according to claim 5, wherein a quantity of the at least one laser emitter is one.

7. The pen mouse according to claim 1, wherein, along the longitudinal direction, a light receiving surface of the first sensor and a light receiving surface of the second sensor have different heights with respect to the circuit board so as to enable the first light path and the second light path to have different lengths.

8. The pen mouse according to claim 1, wherein a quantity of the at least one laser emitter is two, and the two laser emitters are respectively defined as a first laser emitter and a second laser emitter, and wherein the first sensor is configured to receive a first detection light emitted from the first laser emitter, and the second sensor is configured to receive a second detection light emitted from the second laser emitter.

9. The pen mouse according to claim 8, wherein the optical detection module further includes a barrier, the first laser emitter and the first sensor are located at one side of the barrier, and the second laser emitter and the second sensor are located at another side of the barrier.

10. The pen mouse according to claim 1, wherein, along the longitudinal direction, the pen has a pen length, and the optical detection module is spaced apart from the penpoint portion by an arrangement distance that is within a range from 3% to 30% of the pen length.

11. A pen mouse for controlling a movement of a cursor displayed on a monitor, the pen mouse comprising:
   a pen including a pen body and a penpoint portion that is arranged at an end of the pen body, wherein the pen body defines a longitudinal direction and has at least one light-permeable portion arranged adjacent to the penpoint portion, and wherein the pen mouse is configured to implement a cursor control motion by using the penpoint portion to move on a working surface; and
   an optical detection module assembled in the pen body and including:
      a circuit board;

a first sensor and a second sensor both assembled on the circuit board and facing toward the at least one light-permeable portion; and at least one laser emitter assembled on the circuit board and facing toward the at least one light-permeable portion;

wherein, when the longitudinal direction of the pen is perpendicular to the working surface, the at least one laser emitter is configured to emit a detection light passing through the at least one light-permeable portion, the first sensor receives the detection light that travels along a first light path by being reflected from the working surface to pass through the at least one light-permeable portion, and the second sensor receives the detection light that travels along a second light path by being reflected from the working surface to pass through the at least one light-permeable portion;

wherein, when the pen mouse is operated to implement the cursor control motion, the first sensor obtains a first trace by receiving the detection light, and the second sensor obtains a second trace by receiving the detection light; and wherein, when a direction of the first trace is different from a direction of the second trace, the cursor control motion is defined as a pen-spinning motion for compensating the movement of the cursor.

12. The pen mouse according to claim 11, wherein the first light path and the second light path have different lengths, and the length of the first light path is within a range from 30% to 70% of the length of the second light path.

13. The pen mouse according to claim 11, wherein a quantity of the at least one laser emitter is one, each of the first sensor and the second sensor has a light receiving surface, and at least one of the first sensor and the second sensor has a flat transparent layer covering the light receiving surface so as to enable the first light path and the second light path to have different lengths.

14. The pen mouse according to claim 11, wherein the optical detection module further includes a barrier, a quantity of the at least one laser emitter is two, and the two laser emitters are respectively defined as a first laser emitter and a second laser emitter, wherein the first laser emitter and the first sensor are located at one side of the barrier, and the first sensor is configured to receive a first detection light emitted from the first laser emitter, and wherein the second laser emitter and the second sensor are located at another side of the barrier, and the second sensor is configured to receive a second detection light emitted from the second laser emitter.

15. The pen mouse according to claim 11, wherein the at least one laser emitter includes a laser diode and an optical lens that covers the laser diode, and wherein a light emitting surface of the laser diode is spaced apart from the optical lens along the longitudinal direction by a spacing that is within a range from 0.1 mm to 1 mm, so as to enable the optical lens to collimate light emitted from the laser diode to form the detection light that has a lighting angle within a range from 0 degrees to 10 degrees.

16. A pen mouse for controlling a movement of a cursor displayed on a monitor, the pen mouse comprising:

a pen including a pen body and a penpoint portion that is arranged at an end of the pen body, wherein the pen body defines a longitudinal direction and has at least one light-permeable portion arranged adjacent to the penpoint portion, and wherein the pen mouse is configured to implement a cursor control motion by using the penpoint portion to move on a working surface; and an optical detection module assembled in the pen body and including:

a first circuit board;

a second circuit board spaced apart from the first circuit board;

a first sensor and a second sensor both respectively assembled on the first circuit board and the second circuit board, wherein the first sensor and the second sensor face toward the at least one light-permeable portion; and a first laser emitter and a second laser emitter both respectively assembled on the first circuit board and the second circuit board, wherein the first laser emitter and the second laser emitter face toward the at least one light-permeable portion;

wherein, when the longitudinal direction of the pen is perpendicular to the working surface, the first laser emitter and the second laser emitter are configured to respectively emit a first detection light and a second detection light both passing through the at least one light-permeable portion, the first sensor is capable of receiving the first detection light that travels along a first light path by being reflected from the working surface to pass through the at least one light-permeable portion, and the second sensor is capable of receiving the second detection light that travels along a second light path by being reflected from the working surface to pass through the at least one light-permeable portion, and wherein the first light path and the second light path have different lengths;

wherein, when the pen mouse is operated to implement the cursor control motion, the first sensor obtains a first counts per inch (CPI) by receiving the first detection light, and the second sensor obtains a second CPI by receiving the second detection light; and wherein, when the first CPI is not within a range from −30% to 30% of the second CPI, the cursor control motion is defined as a pen-tilted motion for compensating the movement of the cursor.

17. The pen mouse according to claim 16 wherein, along the longitudinal direction, the first circuit board is spaced apart from the penpoint portion by a first arrangement distance, and the first circuit board is spaced apart from the penpoint portion by a second arrangement distance different from the first arrangement distance so as to enable the first light path and the second light path to have different lengths.

18. The pen mouse according to claim 17 wherein, along the longitudinal direction, the pen has a pen length, the first arrangement distance is within a range from 5% to 20% of the pen length, and the second arrangement distance is within a range from 20% to 40% of the pen length.

19. The pen mouse according to claim 16, wherein the first laser emitter includes a laser diode and an optical lens that covers the laser diode, and wherein a light emitting surface of the laser diode is spaced apart from the optical lens along the longitudinal direction by a spacing that is within a range from 0.1 mm to 1 mm, so as to enable the optical lens to collimate light emitted from the laser diode to form the first detection light that has a lighting angle within a range from 0 degrees to 10 degrees.

20. The pen mouse according to claim 16, wherein, when the pen mouse is operated to implement the cursor control motion, the first sensor obtains a first trace by receiving the first detection light, and the second sensor obtains a second trace by receiving the second detection light; and wherein, when a direction of the first trace is different from a direction of the second trace, the cursor control motion is defined as a pen-spinning motion for compensating the movement of the cursor.

\* \* \* \* \*